US006241065B1

(12) United States Patent
Kohlenberg et al.

(10) Patent No.: US 6,241,065 B1
(45) Date of Patent: Jun. 5, 2001

(54) CURRENT COLLECTOR TROLLEY FOR CURRENT COLLECTOR LINES

(75) Inventors: Thomas Kohlenberg, Wetter; Klaus-Dieter Oemus, Hemer; Michael Röhr, Dortmund; Uwe Schulte, Wetter, all of (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/261,692

(22) Filed: Mar. 3, 1999

(30) Foreign Application Priority Data

Mar. 20, 1998 (DE) ........................................ 198 13 828

(51) Int. Cl.[7] ........................................ B60L 5/04
(52) U.S. Cl. ........................................ 191/50
(58) Field of Search ........................................ 191/45 R, 50; 104/139, 140, 93, 107, 108, 109

(56) References Cited

U.S. PATENT DOCUMENTS 2,921,146 * 1/1960 Ericson ........................................ 191/45
3,392,244 * 7/1968 Hillmann ........................................ 191/45

FOREIGN PATENT DOCUMENTS 0 835 699 5/1960 (GB) .
1 347 164 2/1974 (GB) .
1 377 820 12/1974 (GB) .

* cited by examiner

*Primary Examiner*—S. Joseph Morano
*Assistant Examiner*—Robert J. McCarry, Jr.
(74) *Attorney, Agent, or Firm*—Henry M. Feiereisen

(57) ABSTRACT

A current collector trolley for traveling inside a current contact line of a type having a bottom formed longitudinally with a slot and accommodating therein current conductor rails in longitudinal direction, includes a base body extending through the slot to the outside and having sliding contacts forced into contact with the conductor rails during operative mode and electrically connected outside the current contact line to a multicore collector cable. The base body is made of plastic material and has embedded therein at least one flat electric conductor extending across the base body from top to bottom and having upper and lower ends. The upper end of the conductor is positioned in proximity of one of the sliding contacts and electrically connectable thereto, and the lower end of the conductor extends downwards to project out of the base body for electric connection with a core of the collector cable.

12 Claims, 6 Drawing Sheets

CURRENT COLLECTOR TROLLEY FOR CURRENT COLLECTOR LINES

CROSS-REFERENCES TO RELATED APPLICATIONS

This application claims the priority of German Patent Application Serial No. 198 13 828.8-32, filed Mar. 20, 1998, the subject matter of which is incorporated herein by reference.

BACKGROUND OF THE INVENTION

The present invention relates, in general, to a current collector device, and more particularly to a current collector vehicle or trolley for traveling in a current contact line having a bottom formed longitudinally with a slot and accommodating longitudinally therein current conductor rails, with the current collector trolley including a base body extending through the slot to the outside and having sliding contacts which are forced into contact with the conductor rails during operative mode and electrically connected outside the current contact line to a multicore collector cable.

German Pat. No. DE 28 31 882 A1 describes a current collector trolley of this type. The trolley is made essentially of a flat base body having rotatably mounted wheels thereon for travel inside a hollow current collector line. The base body includes sliding contacts which are in forced contact with the conductor rails during operation. A multicore current collector cable is secured to the base body and electrically connected to the sliding contacts, with the base body extending outwards through the longitudinal slot formed in the bottom of the contact line.

A drawback of this conventional current collector trolley is the provision of individual, electrically insulated conductors of round cross section for connection of the sliding contacts with the collector cable so that the longitudinal slot in the contact line must exhibit a relatively great width. As a consequence, the protection of the current contact line against accidental touching of the electrical contacts becomes more complicated. Moreover, the round configuration of the current conductors prevents a compact structure of the trolley so that the travel of the trolley is particularly adversely affected when negotiating a curve where trolleys of longer design are typically subject to increased wear.

SUMMARY OF THE INVENTION

It is thus an object of the present invention to provide an improved current collector trolley, obviating the afore-stated drawbacks.

In particular, it is an object of the present invention to provide an improved current collector trolley which is of compact structure and permits the provision of a narrow longitudinal slot in the current collector line.

These objects, and others which will become apparent hereinafter, are attained in accordance with the present invention by providing a base body which is made of plastic material and has embedded therein at least one flat electric conductor extending across the base body from top to bottom and having upper and lower ends, with the upper end of the conductor being positioned in proximity of one of the sliding contacts and electrically connectable thereto, and with the lower end of the conductor extending downwards to project out of the base body for electric connection with a core of the collector cable.

Through the provision of such an electric conductor which is embedded in the base body, the electric connection between the sliding contacts and the collector cable is kept very short so that the trolley can be designed in a very compact fashion. As the conductors can now be made of rectangular cross section, the contact areas can be expanded while the longitudinal slot in the contact line for feedthrough of the trolley to the outside can be of minimal width. Furthermore, the base body is easy to manufacture and requires minimal assembly.

The manufacture of the base body can be further facilitated by so injection molding the base body that plastic material is molded around the conductors. After fabricating the plastic base body, the electric conductors are completely insulated and additionally provide support for securement of connection elements.

According to another feature of the present invention, the upper end of the conductor has a contact area which is accessible from outside, and the sliding contact has a metal lug in flat engagement with the contact area. Thus, assembly of the collector trolley is simplified because for establishing the electrical contact only a single fastening element is needed which merely presses the metal lug onto the contact surface of the conductor. At the same time, a mechanical securement of the sliding contact is realized thereby.

Suitably, the sliding contacts are so configured as to be insertable into the base body and securable to the conductor, thereby further simplifying the assembly.

According to still another feature of the present invention, the lower end of the conductor may be formed e.g. as a plug contact for insertion in a socket of a receptacle mounted to the collector cable. In this manner, a very simple connection of the conductor to the collector cable is ensured. Moreover, replacement of the collector cable is possible in a very simple manner. A particularly compact configuration of the trolley can be realized by designing the plug contacts as flat contacts.

Suitably, the collector cable is secured directly to the plastic base body.

BRIEF DESCRIPTION OF THE DRAWING

The above and other objects, features and advantages of the present invention will now be described in more detail with reference to the accompanying drawing, in which.

DETAILED DESCRIPTION OF PREFERRED EMBODIMENTS

Figure 1:
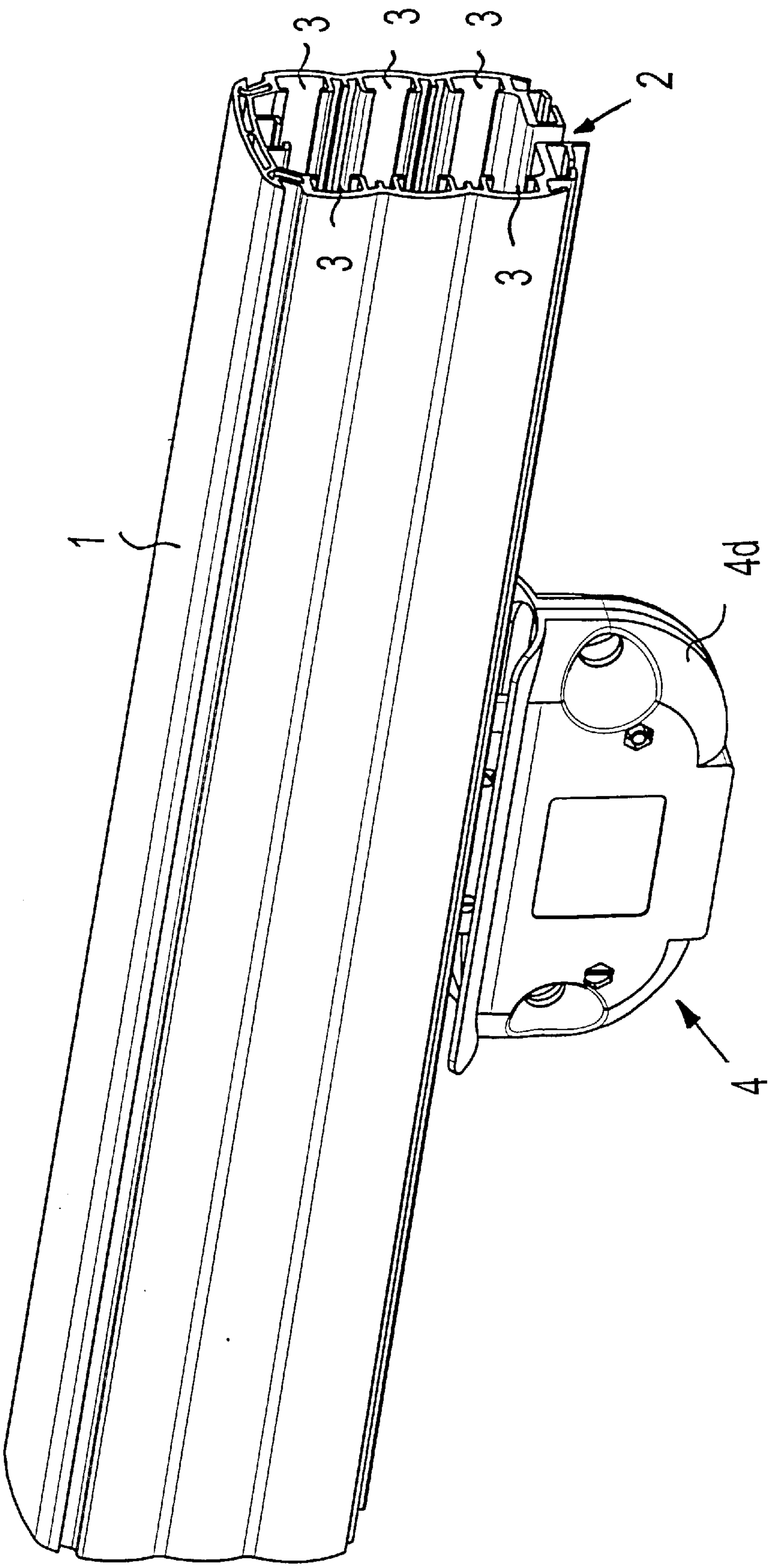
FIG. 1 is a top and side perspective view of a current contact line interacting with a current collector trolley according to the present invention.

Throughout all the Figures, same or corresponding elements are generally indicated by same reference numerals.

Turning now to the drawing, and in particular to FIG. 1, there is shown a top and side perspective view of a current contact line 1 which has a bottom formed with a longitudinal slot 2. The contact line 1 is provided interiorly with anchoring grooves 3 which extend in longitudinal direction of the current contact line 1 and accommodate current conductor rails (not shown). A current collector vehicle or trolley according to the present invention and generally designated by reference numeral 4, travels during operation longitudinally inside the current contact line 1.

Figure 2:
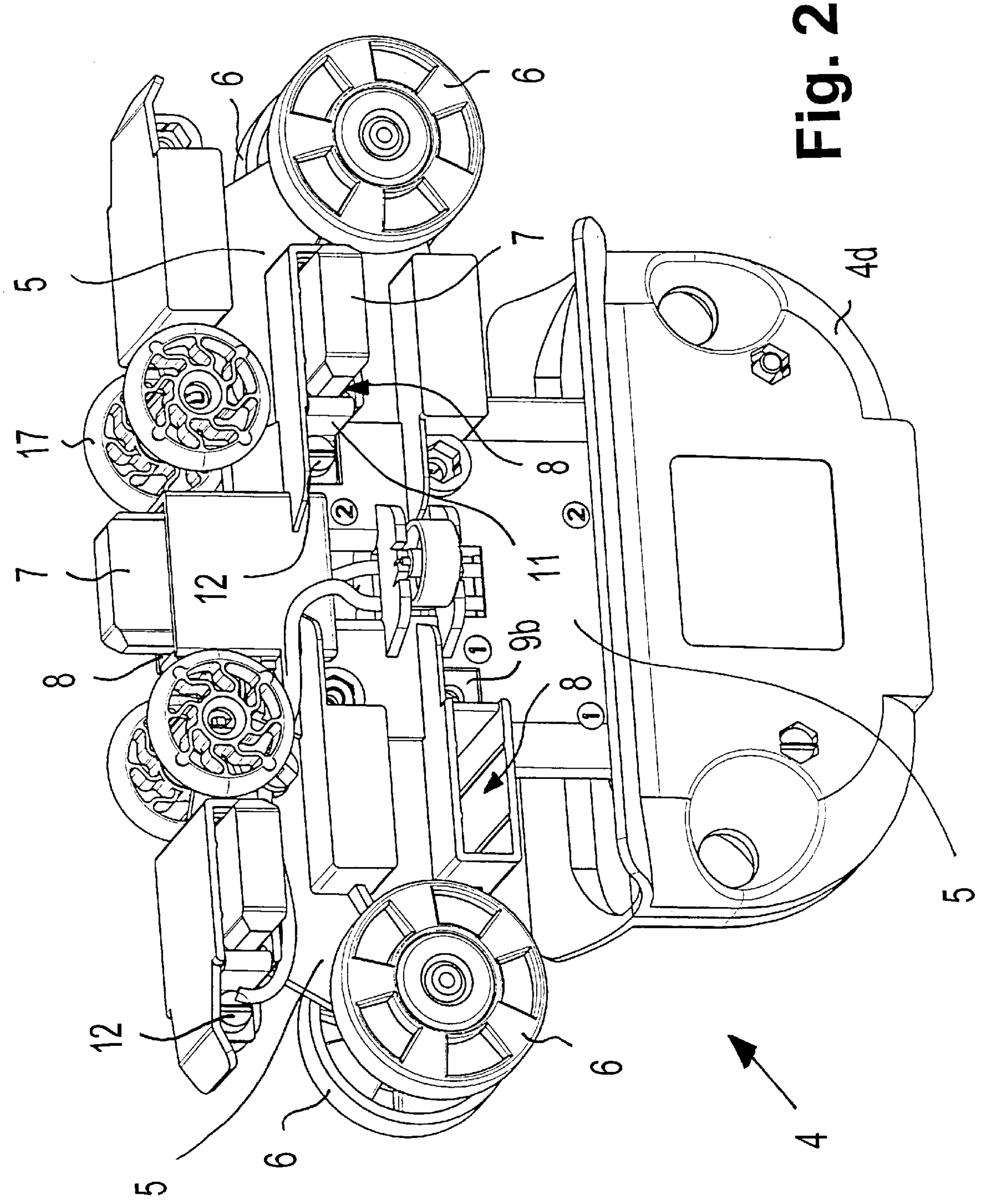
FIG. 2 is a top and side perspective view of the current collector trolley of FIG. 1.
Figure 3:
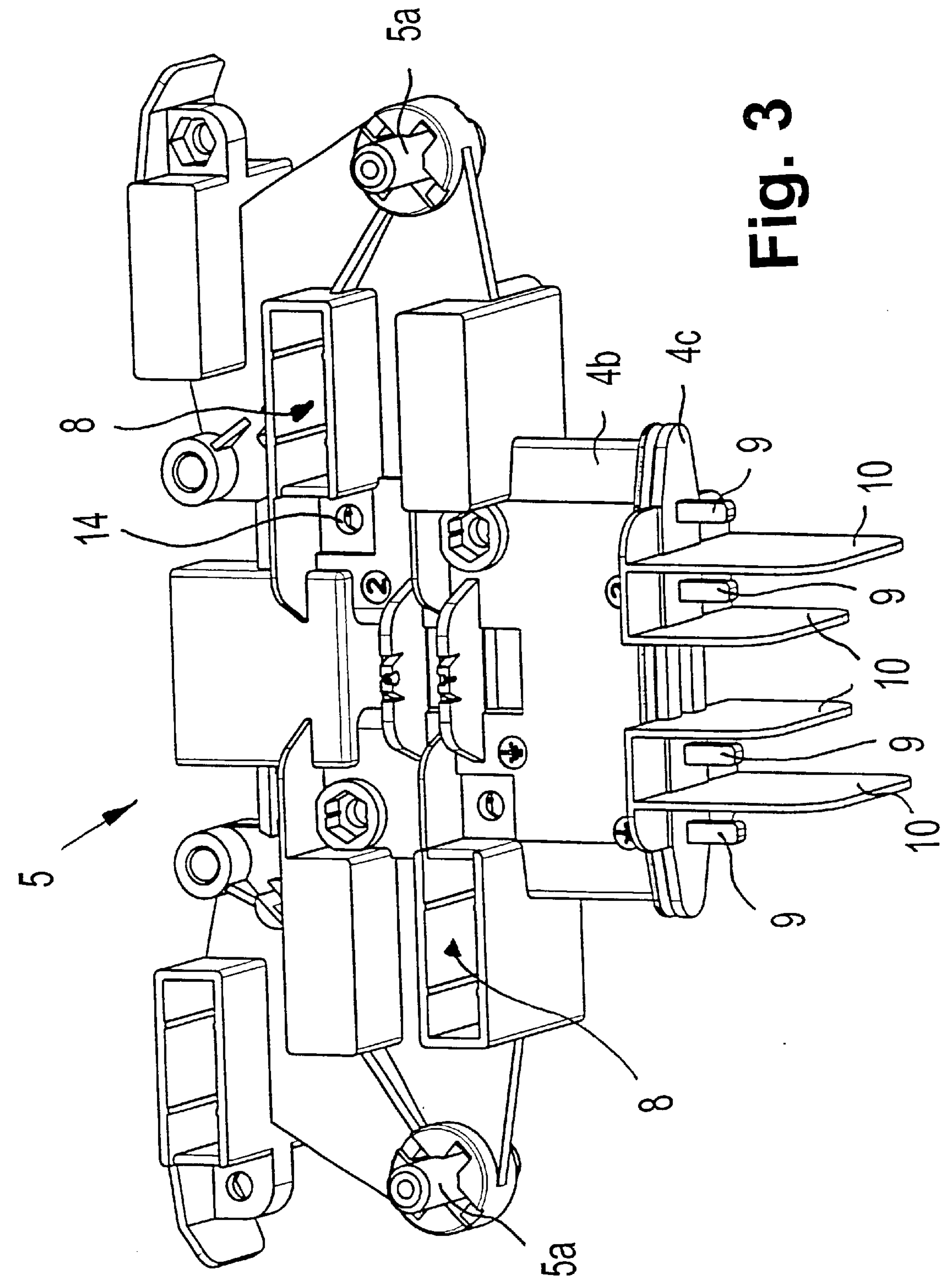
FIG. 3 is a bottom and side perspective view of a plastic base body of the current collector trolley with conductors formed therein through injection molding.

FIGS. 2 and 3 show in more detail the current collector trolley 4 according to the present invention. The trolley 4 is substantially made from a flat base body 5 of plastic material, e.g. polyamide with 25% of glass fiber content for reinforcement, and includes two wheels 6 which are rotatably mounted on respective hubs 5a formed on the base body 5. The base body 5 is extended downwardly by a narrow connection bridge 4b which projects through the slot 2 of the current contact line 1 and terminates in a bottom 4c. Disposed on both flat sides of the base body 5 are sliding contacts 7 which extend across the flat sides and are received in pockets 8 formed on the base body 5. During operation, the sliding contacts 7 are forced into contact with the conductor rails, e.g. by suitable springs (not shown) or the like. Projecting out from the bottom 4c of the base body 5 are downwardly extending electric conductors 9 which are electrically insulated from one another by interposed flat plastic partitions 10, with the conductors 9 and the partitions 10 enclosed by a two-part housing 4d.

Figure 4:
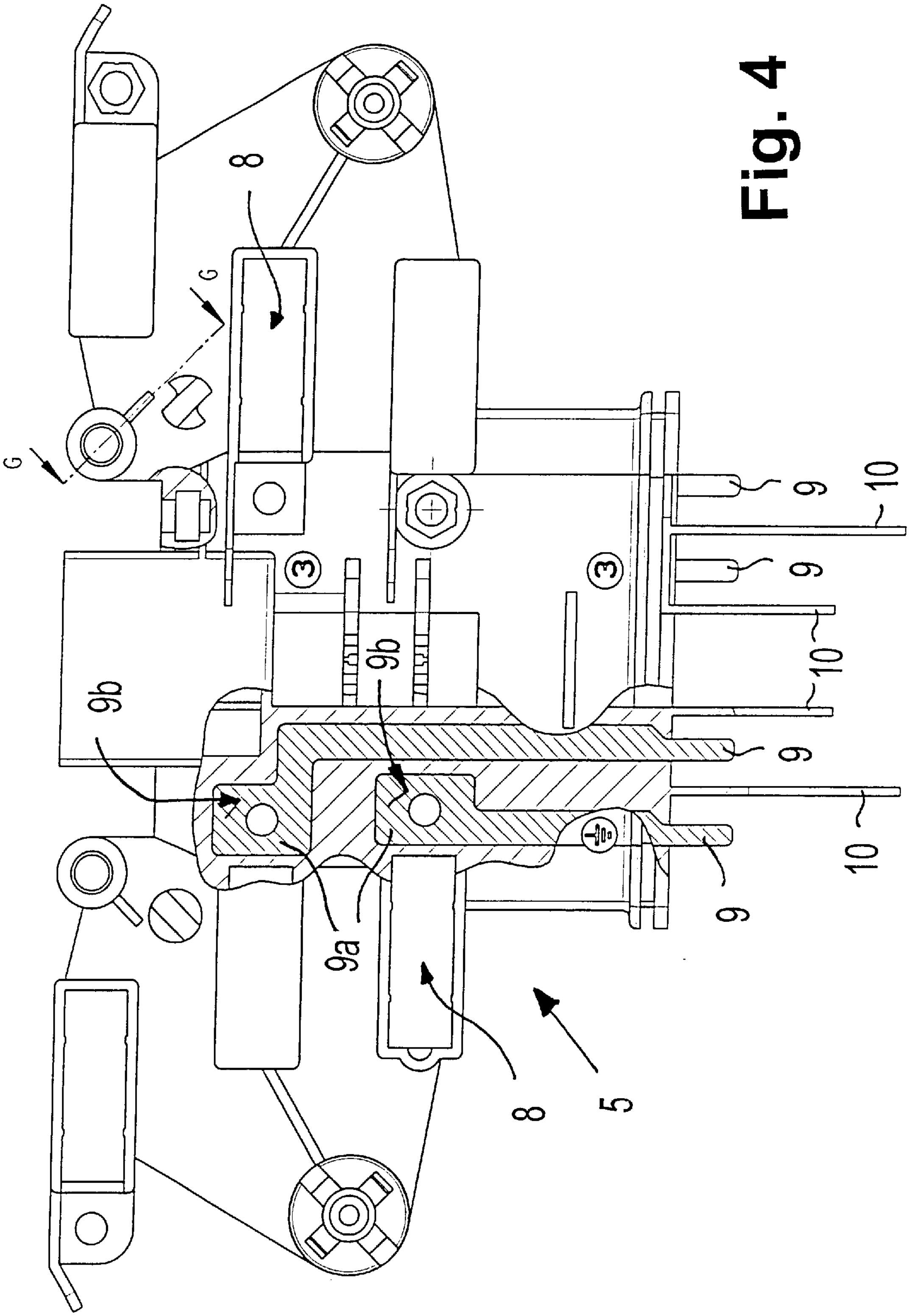
FIG. 4 is a partially sectional side view of the base body, showing internal portions of the conductor.

As shown in FIG. 4, the electric conductors 9 have a flat configuration and are fully embedded within the plastic base body 5 except for the conductors ends which jut outwards. The conductors 9 have a rectangular cross section and extend vertically across the base body 5 from top to bottom. With their upper end 9a, the conductors 9 are positioned in proximity to the sliding contacts 7 to allow establishment of an electric contact thereto by providing the end 9a with a contact surface 9b which is accessible from outside and is in flat engagement with a substantially L-shaped metallic lug 11 of the associated sliding contact 7 (cf. FIG. 2). Securement of the contact surface 9b and the metallic lug 11 is realized by a screw fastener 12 which is received in a bore 14 at the end of the conductor 9 and presses together overlapping coextensive parts of the contact surface 9b and the metallic lug 11.

Figure 5:
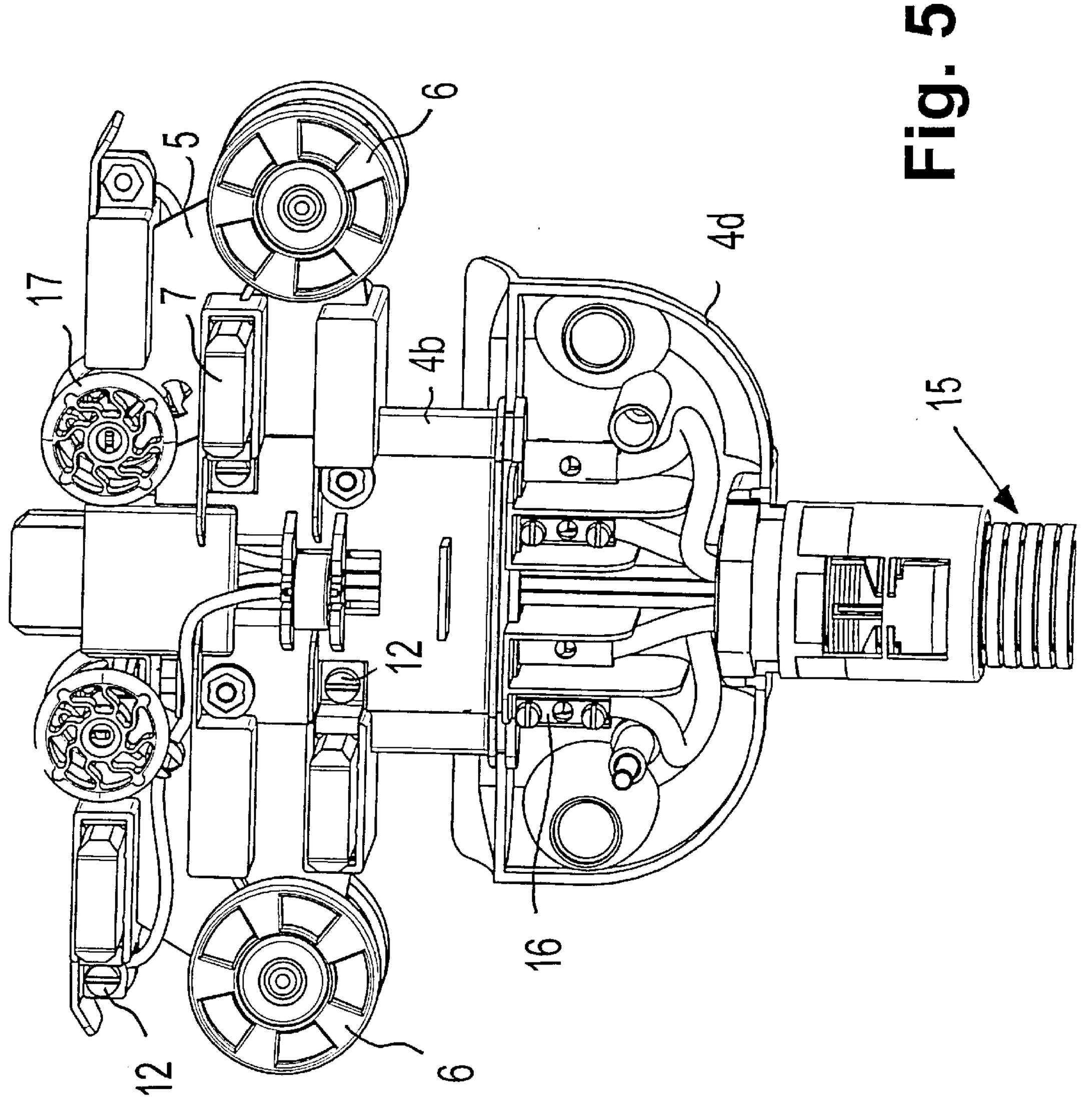
FIG. 5 is a top and side perspective view of the current collector trolley of FIG. 1, showing in detail an exemplified connection of the conductors to a current collector cable.

The base body 5 is fabricated through injection molding in a suitable mold in which the conductor 9 are placed in a common plane and enveloped with plastic. As shown in particular in FIG. 5, the lower ends of the conductors 9 are formed as flat contacts for attachment to respective core ends of a multicore current collector cable, generally designated by reference numeral 15 and connectable to an external current consumer. As shown by way of example, the connections between the flat contacts 9 and the cores of the cable 15 are realized by suitable screw joints 16. Alternatively, the flat contacts 9 may also be adapted for plugged connection in respective sockets of a receptacle (not shown) which is secured to the multicore current collector cable. Persons skilled in the art will understand that it is also feasible to secure the cores of the collector cable by a clamp. As further shown in FIG. 5, the collector cable 15 is additionally seated in an opening of the housing 4d of the base body 5 to properly secure the current collector cable 15 in place.

Figure 6:
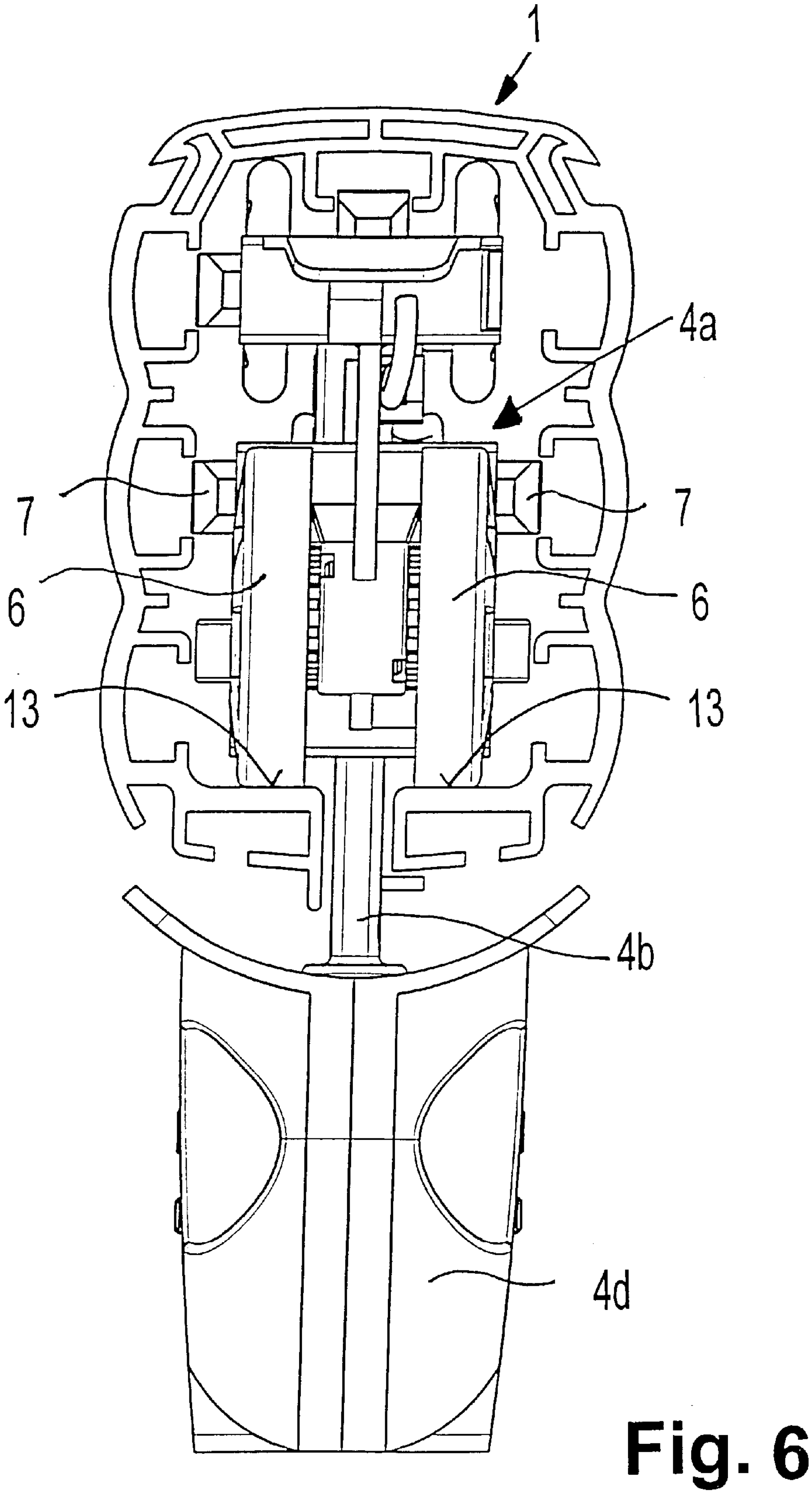
FIG. 6 is a cross section of the current contact line with installed current collector trolley.

Turning now to FIG. 6, there is shown a cross section of the current contact line 1 with installed current collector trolley 4 which travels on the wheels 6 upon horizontal running surfaces 13 formed by the contact line 1, whereby the narrow connection bridge 4b extends through the slot 2 for connecting the internal portion of the trolley 4 with the external portion or housing 4d. Reference numeral 17 designates guide rollers which support the trolley 4 against the confronting upper end of the current contact line 1 to thereby additionally guide the trolley 4 during its passage.

While the invention has been illustrated and described as embodied in a current collector trolley for current collector lines, it is not intended to be limited to the details shown since various modifications and structural changes may be made without departing in any way from the spirit of the present invention.

What is claimed is:

1. A current collector trolley for traveling inside a current contact line of a type having a bottom formed longitudinally with a slot and accommodating longitudinally therein current conductor rails; said current collector trolley comprising a base body extending through the slot to the outside and having sliding contacts in forced contact with the conductor rails during operative mode and electrically connected outside the current contact line to a multicore collector cable, said base body being made of plastic material and having embedded therein at least one flat electric conductor extending across the base body from top to bottom and having upper and lower ends, said upper end of the conductor being positioned in proximity of one of the sliding contacts and electrically connectable thereto, and said lower end of the conductor extending downwards to project out of the base body for electric connection with a core of the collector cable.

2. The trolley of claim 1 wherein the plastic base body is an injection molded element, with plastic material so injected as to envelope the conductor.

3. The trolley of claim 1 wherein the upper end of the conductor has a contact area accessible from outside, said sliding contact having a metal lug in flat engagement with the contact area.

4. The trolley of claim 1 wherein the sliding contacts are so configured as to be insertable into the base body and securable to the conductor.

5. The trolley of claim 1 wherein the lower end of the conductor is formed as contact for connection to the collector cable.

6. The trolley of claim 5 wherein the conductor contact is connected to the collector cable by a screwed joint.

7. The trolley of claim 5 wherein the conductor contact is formed as plug contact for insertion in a socket of a receptacle mounted to the collector cable.

8. The trolley of claim 1 wherein the lower end of the conductor is a flat contact.

9. The trolley of claim 1 wherein the collector cable is designed for securement to the base body.

10. In combination:

a current contact line having a bottom formed longitudinally with a slot and accommodating therein a current conductor rail;

a current collector trolley having a base body extending through the slot to the outside and having a sliding contact in forced contact with the conductor rail in operative mode and electrically connected outside the current contact line to a multicore collector cable, said base body being made of plastic material and having embedded therein at least one electric conductor extending across the base body and having upper and lower ends, said upper end of the conductor being positioned in proximity of the sliding contact, and said lower end of the conductor extending downwards to project out of the base body for electric connection with one core of the collector cable; and connecting means for electrically connecting the conductor with the sliding contact.

11. The combination of claim 10 wherein the lower end of the conductor is designed as flat contact.

12. The combination of claim 10 wherein the connecting means includes a metal lug in contact with the sliding contact, and a fastener clamping a contact area of the upper end of the conductor with the metal lug to thereby realize a flat engagement of the metal lug with the contact area.

* * * * *